United States Patent [19]

Lederman

[11] Patent Number: 5,328,010
[45] Date of Patent: Jul. 12, 1994

[54] OVERRUNNING ROLLER CLUTCH WITH IMPROVED SELF PROTECTING SPRING

[75] Inventor: Frederick E. Lederman, Sandusky, Ohio

[73] Assignee: General Motors Corporation, Detroit, Mich.

[21] Appl. No.: 136,434

[22] Filed: Oct. 13, 1993

[51] Int. Cl.$^5$ .............................................. F16D 41/07
[52] U.S. Cl. .................................. 192/45; 188/82.84
[58] Field of Search ................... 192/44, 45; 188/82.84

[56] References Cited

U.S. PATENT DOCUMENTS

| | | | |
|---|---|---|---|
| 4,088,211 | 5/1978 | Doller et al. | 192/45 |
| 4,368,809 | 1/1983 | Husmann | 192/45 |
| 4,555,002 | 11/1985 | Baker | 192/45 |
| 4,570,762 | 2/1986 | Husmann | 188/82.84 |
| 4,664,237 | 5/1987 | Lederman et al. | 192/45 |
| 4,667,788 | 5/1987 | Johnston et al. | 192/45 |
| 4,711,330 | 12/1987 | Lederman | 192/45 |
| 4,712,661 | 12/1987 | Lederman et al. | 192/45 |
| 4,828,085 | 5/1989 | Lederman | 192/45 |
| 4,828,086 | 5/1989 | Lederman | 192/45 |
| 4,830,157 | 5/1989 | Lederman | 192/45 |
| 4,850,462 | 7/1989 | Lederman | 192/45 |
| 4,850,464 | 7/1989 | Doller et al. | 192/45 |
| 4,901,833 | 2/1990 | Lederman | 192/45 |
| 4,932,508 | 6/1990 | Lederman | 192/45 |

*Primary Examiner*—Leslie A. Braun
*Assistant Examiner*—Andrea Pitts
*Attorney, Agent, or Firm*—Patrick M. Griffin

[57] ABSTRACT

An improved overrunning clutch roller energizing spring of the type that has a series of flat leaves forming V's with energy storing folds or pleats at the peak of each V. The front and rear leaves of the spring each have an integrally formed end loop with a diameter greater than the height beyond which the spring should not be compressed. The loop diameter is less than the space differential available between the spring pleats and the side rails. When the spring compresses back toward the roller pocket base, the loops hit on each side of the spring, preventing the spring from compressing further than its solid height. The end loops do not hit or rub on the spring pleats, and prevent the spring pleats from rubbing on the pocket side rails.

3 Claims, 6 Drawing Sheets

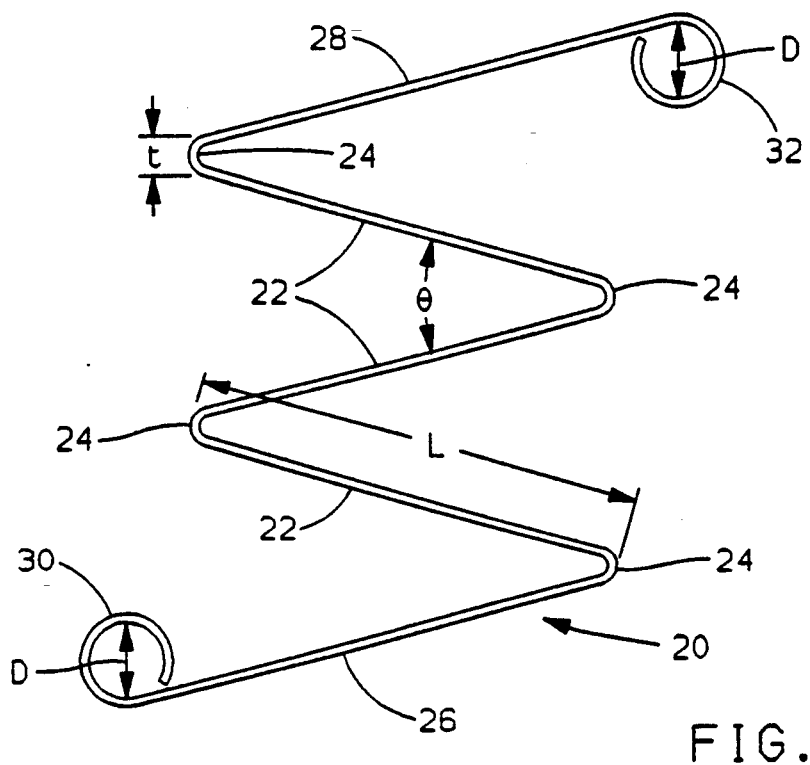
FIG. 3
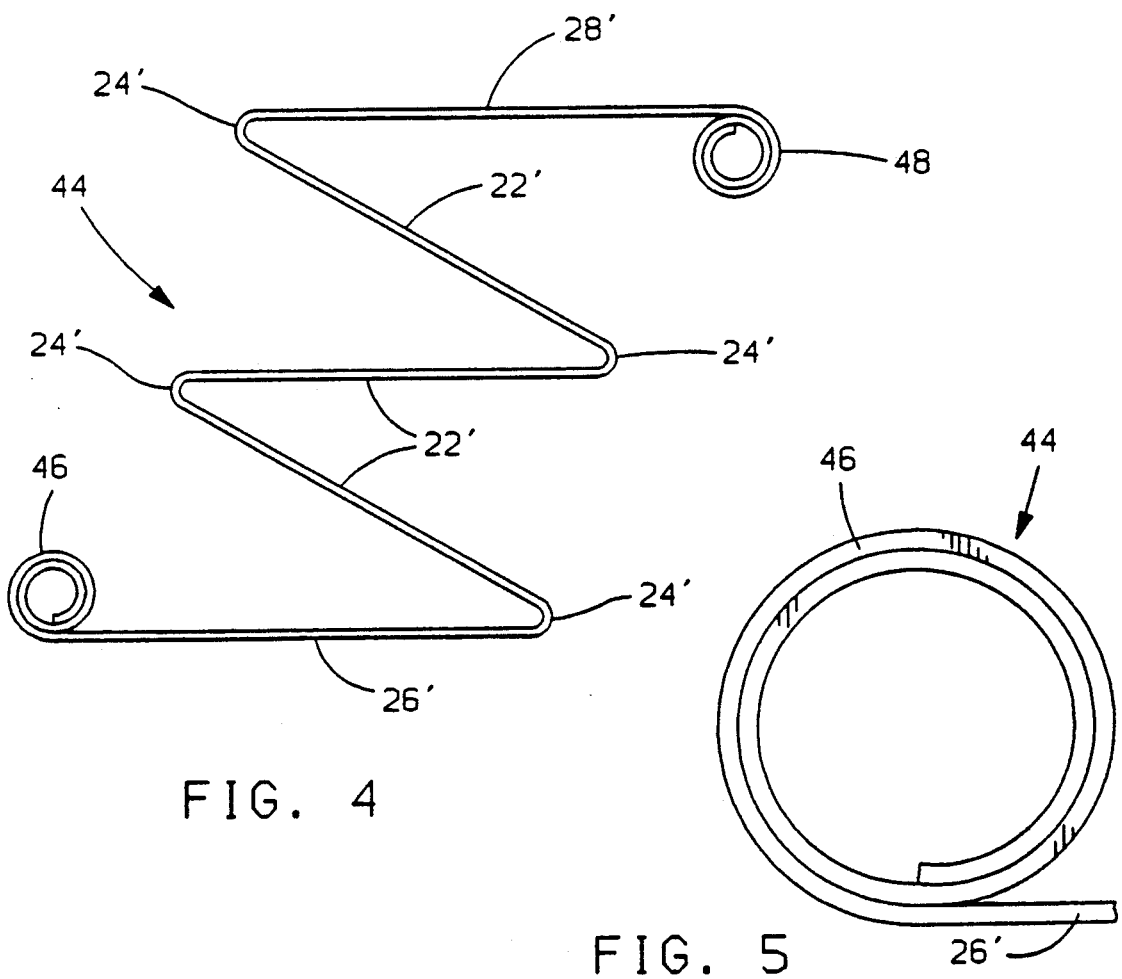
FIG. 4
FIG. 5

OVERRUNNING ROLLER CLUTCH WITH IMPROVED SELF PROTECTING SPRING

This invention relates to overrunning roller clutch energizing springs in general, and specifically to an accordion type energizing spring with an improved structure that protects it against over compression.

BACKGROUND OF THE INVENTION

Overrunning roller clutches typically have cage roller pockets with a pair of parallel side rails and flat base. A roller moves back and forth in the pocket, toward and away from the base, over a normal path of travel that does not bring the roller too near the pocket base. However, disturbing forces can occur that can cause one or more rollers to shift farther back toward the base of the pocket. Each roller is continually urged forwardly, away from it's pocket base, by an individual compression energizing spring. The most common type of energizing spring is a so called accordion spring, with a series of flat leaves joined at resilient folds or pleats to form a series of V's. The front and rear end spring leaves are passive, abutted with the roller and pocket base respectively. The intermediate, active spring leaves move together and apart about the live hinge of the pleats. The most critical part of such a spring is the pleat, which stores and releases energy. Ideally, the spring pleats would be protected again two possible kinds of damage. One potential risk is rubbing of the spring pleats against the pocket side rail inner surfaces as the spring compresses and expands with the moving roller. Another potential risk is over compression of the spring. Each pleat has a minimum thickness, beyond which it cannot be compressed without risking exceeding its elastic limit. Consequently, the spring as a whole has a characteristic solid height, the distance beyond which it cannot be compressed without risking stressing the pleats. The solid height corresponds roughly to the sum of the pleat minimum thicknesses on either side of the spring.

Recent patent activity has dealt with both aspects of accordion spring pleat protection. U.S. Pat. No. 4,368,809 to Husmann protects the spring pleats from side rail wear by with a tab on the front end pleat of the spring that rides between one side rail and an end of the roller, keeping the spring centered so that the pleats are spaced away from the side rails. U.S. Pat. No. 4,850,464 to Lederman provides a simpler spring which self protects its pleats against side rail wear without guidance from the roller. The type of accordion spring disclosed there, one in which all the pleats have the same subtended angle, also experiences an inherent side thrust toward one of the side rails as the spring expands and contracts. A deliberately lengthened rear end leaf of the spring hits one of the side rails as the spring shifts to the side, thereafter keeping all the pleats away from both side rails as the spring operates. U.S. Pat. No. 4,932,508 to Lederman deals with over compression. All leaves of the spring disclosed there, except for the front end leaf, have a special resilient finger lanced out of the center that is designed to hit and bend against an adjacent leaf only when high compression occurs, thereby providing a restoring force to prevent the spring from being compressed past its solid height. This design has limitations in that it works only through the resilience of the fingers, which inevitably require some space between the leaves, and so limits how far the spring can totally compress. It is also a more difficult design to manufacture, as compared to a simple spring with uninterrupted leaves. Also, the spring fingers per se do nothing to prevent rubbing wear of the spring pleats.

SUMMARY OF THE INVENTION

The invention provides a new accordion spring design that provides complete over compression protection, without limiting total potential compression. The same structure that provides over compression protection can also be used to provide pleat wear protection and other advantages.

In the embodiment disclosed, an accordion type roller energizing spring includes two complete V's, with two spring pleats on each side of the spring. The intermediate spring leaves are equal length, but significantly shorter than the total width of the roller pocket. The front and rear leaves of the spring are equal length, and longer than the intermediate leaves, though still somewhat shorter than the pocket width. The terminal ends of both the front and rear spring leaves have a stop flange in the form of a circular loop with a diameter substantially equal to, or just greater than, the spring's characteristic solid height. The loop diameter is also less than half of the pocket width-intermediate spring leaf space differential. Consequently, as the spring contracts and expands with normal roller travel, the loops stay clear of the spring pleats. However, the loops will also abut the side rails of the roller pocket if any forces shift the spring side to side, and thereby keep the pleats from rubbing on the side rails. If and when the roller moves back toward the pocket base far enough to compress the spring to its solid height, the loops are trapped between the roller and the pocket base. The loops are stiffer than the spring pleats, and prevent the spring from over compressing without limiting normal spring operation. The loops are relatively easy to manufacture, and the intermediate spring leaves are conventional and uninterrupted. In addition, the loops can provide other advantages, such as enhanced handling and prevention of part tangling during assembly.

DESCRIPTION OF THE PREFERRED EMBODIMENT

These and other features and advantages of the invention will appear from the following written description, and from the drawings, in which:

FIG. 3 is a plan view of the FIG. 2 embodiment;

FIG. 4 is a plan view of a second embodiment of the invention;

FIG. 5 is an enlargement of just the stop flange of the FIG. 4 embodiment;

Figure 1:
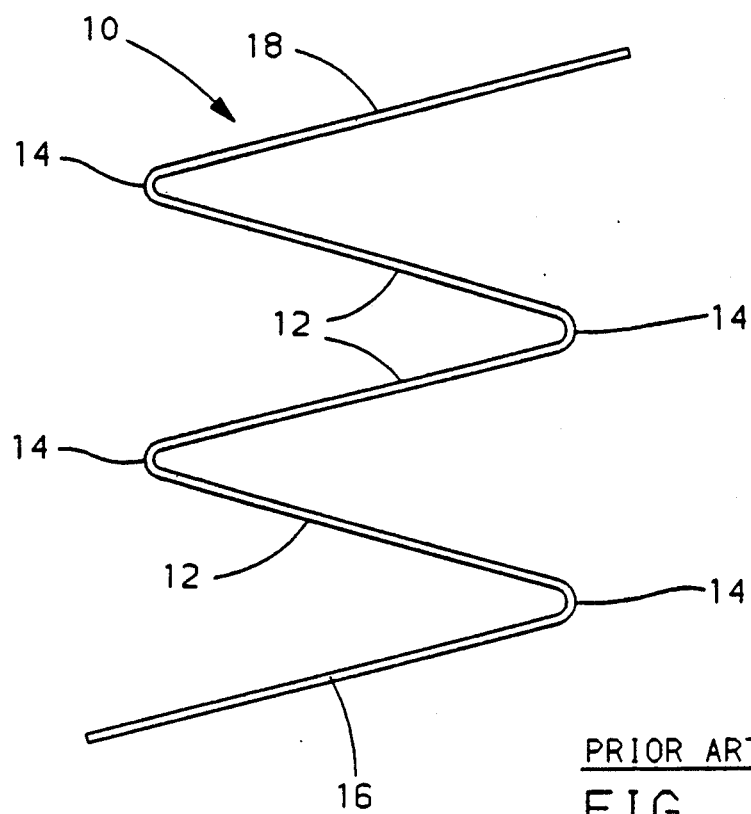
FIG. 1 is a view of a prior art accordion type roller clutch energizing spring.

Referring first to FIG. 1, an embodiment of a prior art accordion type energizing spring is indicated generally at 10. Spring 10 is a unitary, spring steel structure comprised of two complete V's, each of which consists of two flat leaves, and a fold or pleat joining them at the point of the V. Here, there are three equal length intermediate leaves 12, four pleats 14 joining them (giving two on each side of spring 10), and two longer end pleats, rear leaf 16 and front leaf 18. Spring 10 is the type that is completely symmetrical, that is, in which each pleat 14 comprises an equal angle, and in which the rear and front leaves 16 and 18 extend oppositely, so that an equal number of pleats is located on each side of the spring. Therefore, spring 10 can be placed in a roller pocket with no preferred orientation, and does not actually have a left, right, rear or front until assembled. This is the type of spring covered by U.S. Pat. No. 4,850,464 noted above, which is inherently subject to a directional side thrust in operation, and in which the longer end leaves 16 and 18 protect the pleats 14 against the kind of rubbing wear described above. Other accordion type springs have end leaves that are squared off, that is, in which the angles subtended by the endmost pleats are roughly half that of the intermediate pleats. Such a squared off spring is not subject to side thrust in operation. Other springs might have end pleats that extended in the same direction, rather than oppositely, which would create one extra pleat on one side of the spring, rather than an equal number of pleats on both sides. Regardless, any accordion spring will have the characteristic series of V's, with spring pleats of whatever number on each side, and front and rear end leaves. It will also have a characteristic solid height beyond which it should not be compressed. The invention described below, though shown in conjunction with the FIG. 1 type of spring, may be incorporated in accordion spring to protect it against over compression.

Figure 2:
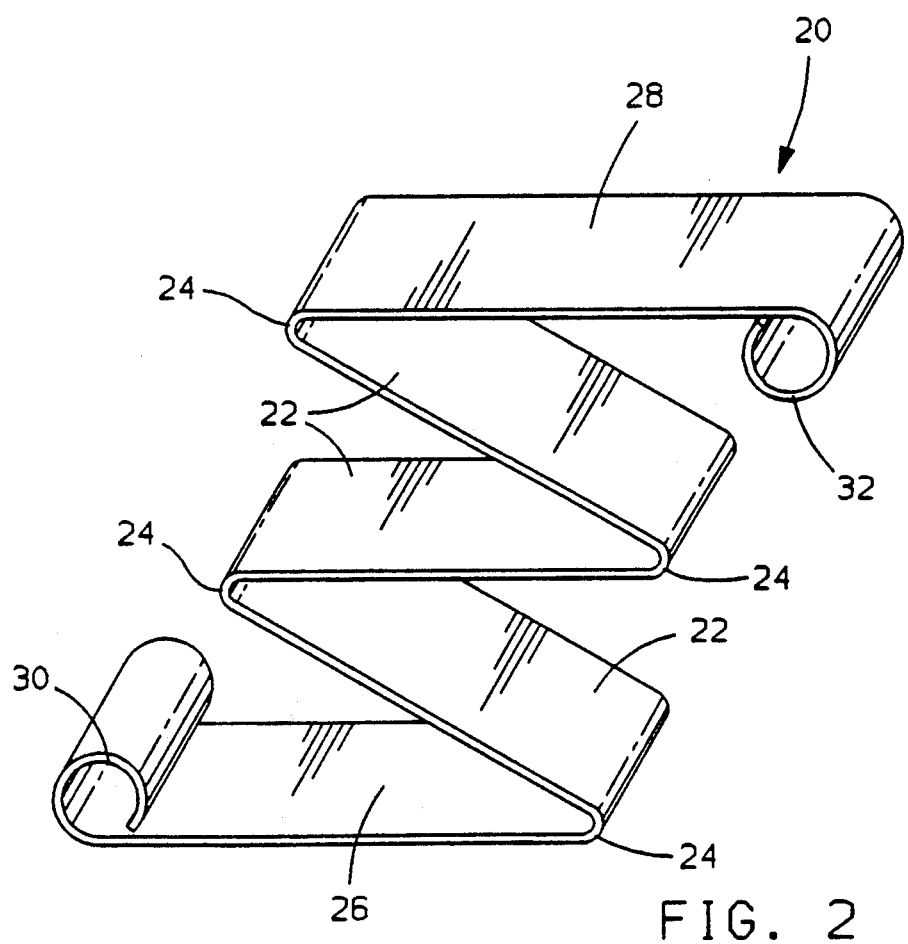
FIG. 2 is a perspective view of one embodiment of an energizing spring according to the invention.

Referring next to FIGS. 2 and 3, a first embodiment of the invention is indicated generally at 20. Spring 20 is the symmetrical type of accordion spring described above, with three intermediate leaves 22 of equal length L, two pleats 24 on a side subtending equal angles theta, and longer rear and front leaves 26 and 28. Each pleat 24 has a minimum thickness t, compression beyond which risks exceeding the elastic limit. Consequently, the solid height H for spring 20 as a whole is approximately two times t, the sum of the pleat minimum thicknesses on each side. Spring 20 is distinguished from a conventional spring by a pair of stop flanges, rear and front, in the form of generally circular loops 30 and 32 integrally formed at the terminal ends of the rear and front end leaves 26 and 28 respectively. Each end leaf 26 and 28 is, therefore, longer than an intermediate leaf 22 by roughly the diameter D of its loop 30 and 32, a diameter that is determined in relation to other structure described next.

Figure 8:
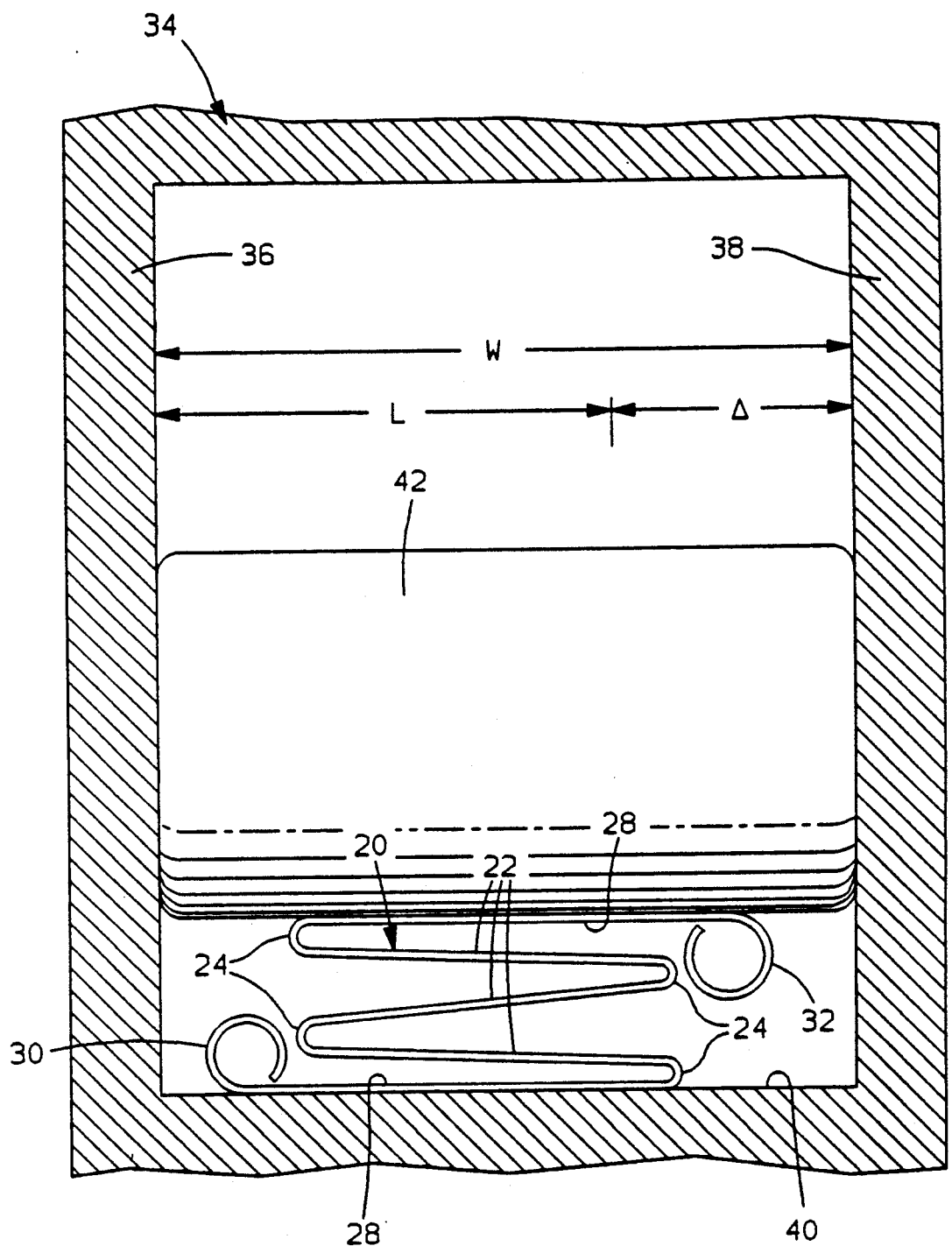
FIG. 8 is a plan view of the FIG. 2 spring in a roller pocket, and being compressed toward the pocket base.

Referring next to FIG. 8, spring 20 is designed to operate in a rectangular roller pocket, indicated generally at 34, which includes two parallel side rails 36 and 38 separated by a width W and a flat base 40. A cylindrical roller 42 has an end to end length just slightly less than W, so that it can travel back and forth freely, toward and away from base 40, over a typical normal travel path. The position shown in FIG. 8 is well out of the normal travel path, and heading toward spring compression approaching the solid height maximum. The pocket width W and length of roller 42 are a given, determined by the load capacity needed in the particular roller clutch application. Spring leaf length L, in turn, is made significantly shorter than W, enough to leave a substantial space differential "delta" within pocket 34. That space differential is used to advantage in the invention, as is described below.

Figure 9:
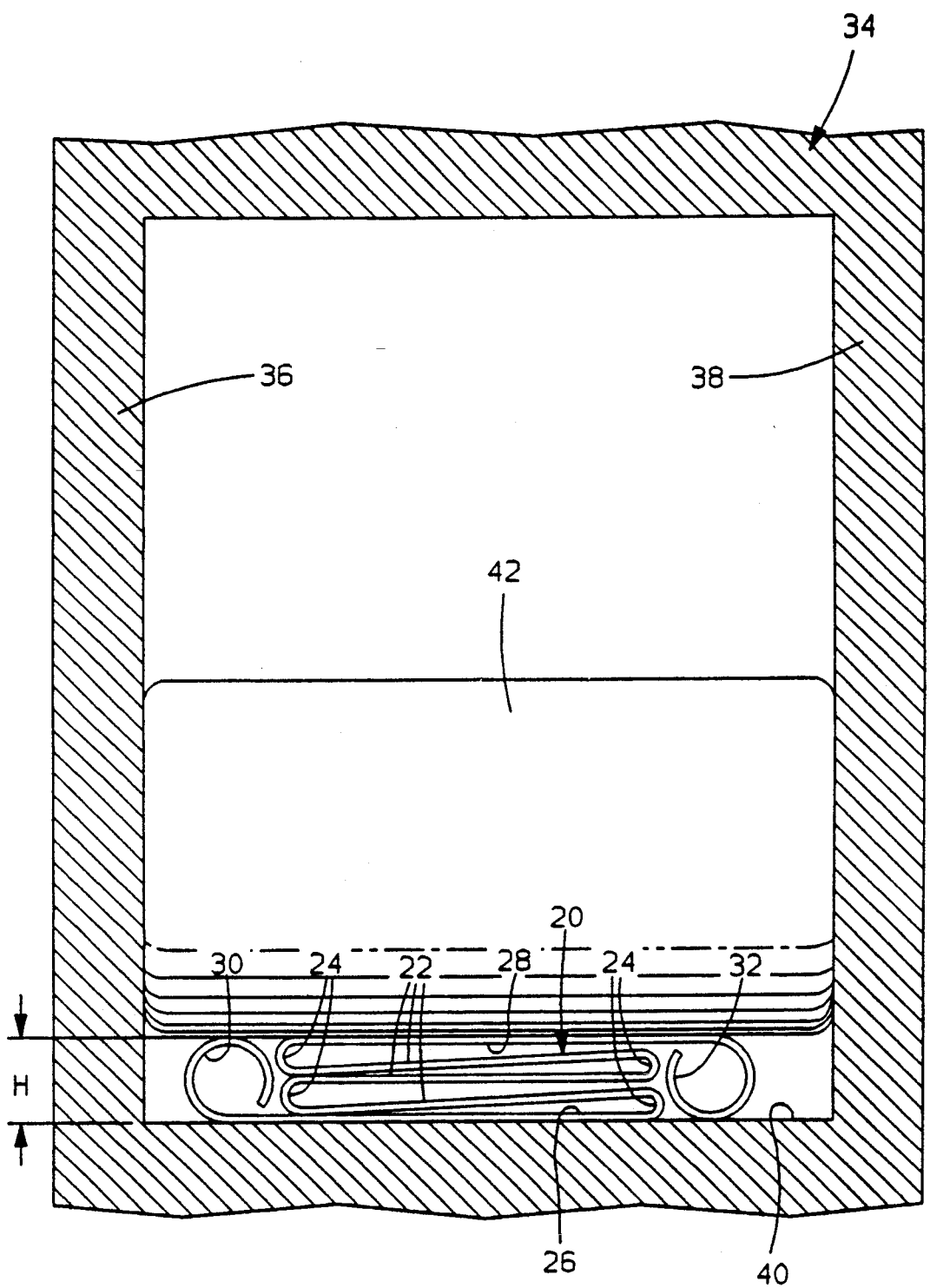
FIG. 9 is a view like FIG. 8, but showing the spring compressed to its so called solid height.

Referring next to FIGS. 3, 8 and 9, the relationship of the spring loops 30 and 32 to the dimensions and parameters noted above is illustrated. In FIG. 9, the solid height "H" of spring 20 is illustrated. The diameter D of each loop 30 and 32 is made just slightly greater than H. Consequently, they will make solid contact between roller 42 and pocket base 40, on each side of spring 20, before the spring pleats 24 can be damaged. Until that point, however, the pleats 24 bend normally. When the loops 30 and 32 hit, they can also compress somewhat, deforming slightly toward an oval shape, and so provide some cushioning and restoring force. Primarily, however, they act as protective stop members, so no additional spring protective structure in pocket 34 is needed. The diameter D is also made less than half of the differential "delta" defined above, so that neither loop 30 or 32 hits or rubs on the pleats 24 as the spring 20 expands and contracts. It will be recalled that spring 20 is the completely symmetrical, all equal angles type, so that, as it operates, it experiences a continual bias or shift to the left, as viewed in FIG. 8. This keeps the rear loop 30 abutted with the corner of pocket base 40 and one side rail 36. Consequently, the pleats 24 on both sides of spring 20 are also protected against rubbing wear on either side rail 36 or 38, just as with the spring described in U.S. Pat. No. 4,850,464 noted above. Also, as with the spring described in that patent, as spring 20 expands and contracts with the moving roller 42, the front loop 32 moves toward and away from the side rail 38 that it faces. However, with the rear loop 30 maintained in its rear corner, and spring 20 kept toward side rail 36, front loop 32 never moves close enough to side rail 38, even at maximum forward expansion, to rub significantly. Stated differently, front loop 32 has more than one half of the (W-L) differential in which to move.

Referring next to FIGS. 4 and 5, a second embodiment of the invention, indicated generally at 44 is illustrated. Spring 44 is very similar to spring 20, and similar structure is given the same number with a prime. The rear and front loops 46 and 48, however, are formed as double thickness loops. Spring 44 would operate just as spring 20 would, but the double thickness loops 46 and 48 would be much stiffer, and capable of resisting more roller compression force. The loop shaped stop flanges illustrated in both embodiments are advantageous in that they present only curved, convex, non dragging surfaces to every other structure that they potentially contact, be it roller 42, side rails 36 and 38, pocket base 40, or the spring pleats 24. Such a design would work well with a spring that had so called squared off end leaves. Such a spring would not have an inherent bias toward either side rail 36 or 38 in operation, but could shift side to side non directionally and randomly. This could bring front loop into rubbing contact with its side rail 38, but its curved, convex surface would not catch and scrape, as could the sharp edge of a conventional spring end leaf. Most generally, however, the basic structural characteristics that a stop flange would need to operate would be that it be high enough, as measured in the direction perpendicular to the spring end leaf 26 and 28, to just exceed the spring solid height H. In the case of the rear stop flange, it would also have to be wide enough, as measured in the direction parallel to the rear spring leaf, so as to solidly hit roller 42, and not just slip into the clearance between the left end of roller 42 and the left side rail 36. Thus, for the rear stop flange, a simple L shaped tab bent up 90 degrees from rear end leaf 26 would not likely work, as the stock from which most springs are formed is too thin not to slip into the roller end-side rail clearance. Each stop flange should also be narrow enough not to rub on its own spring pleats at full compression, that is, should be less wide than one half of the (W-L) differential. Within those simple constraints, many shapes for the stop flanges would be possible, C shaped, U shaped, oval shaped, even a simple L shape in the case of the front stop flange. A single stop flange, front or rear, if stiff enough, would likely give enough protection from its side to take care of the entire spring. Such a one side only stop flange design could be used with the type of spring in which the front and rear leaves extended in the same direction, though that is not a common or generally preferred type of spring. Providing two stop flanges, both front and rear, with one located on each side of the spring, is much preferred, since it provides complete over compression protection, keeps roller 42 parallel to pocket base 40, prevents the spring pleats 24 from rubbing on the side rails 36 and 38, and makes for a completely symmetrical spring that can be installed in pocket 34 in any direction.

Figure 6:
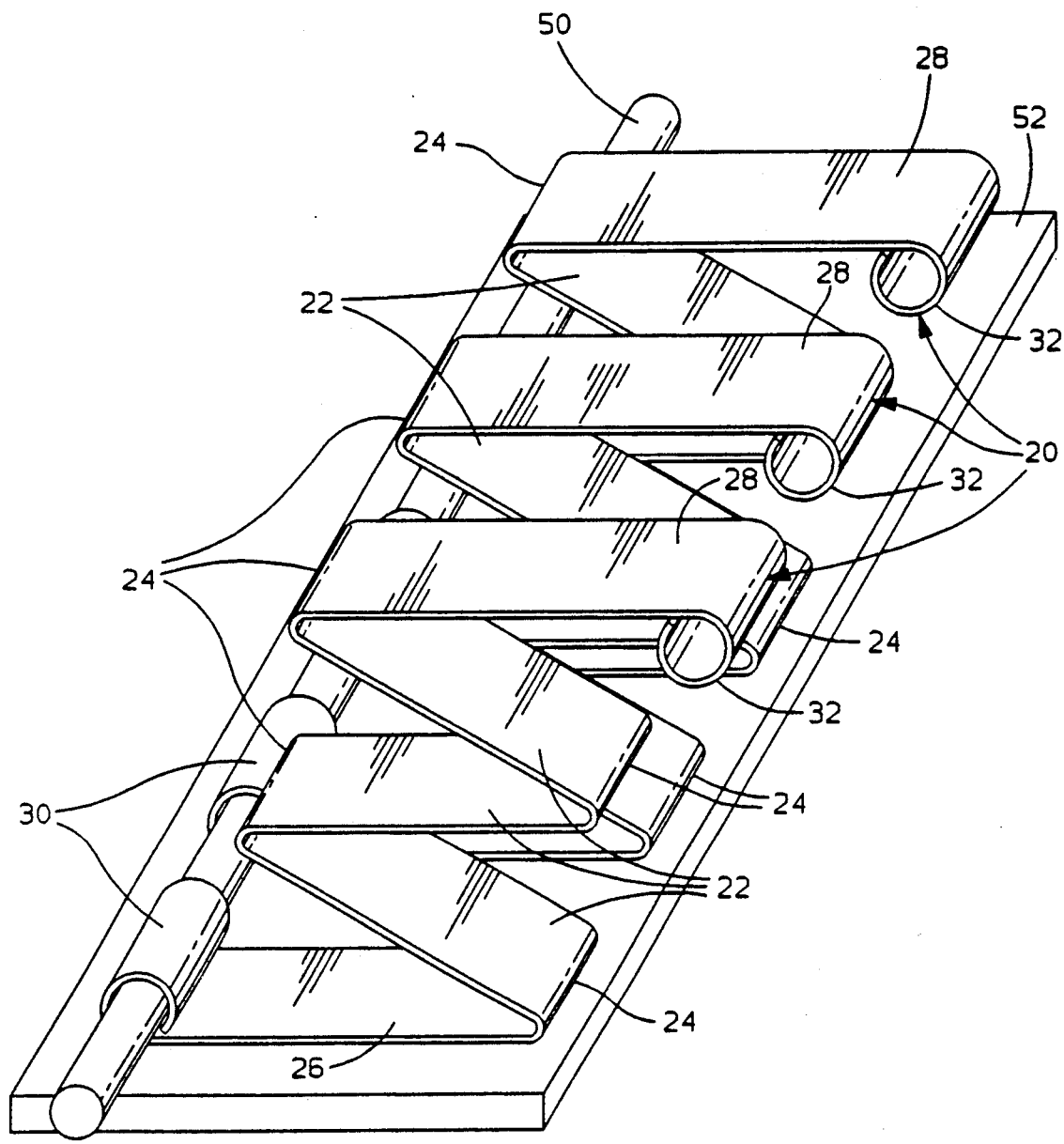
FIG. 6 is a plan view of a series of the FIG. 2 embodiment, illustrating improved handling possible during manufacture and assembly.
Figure 7:
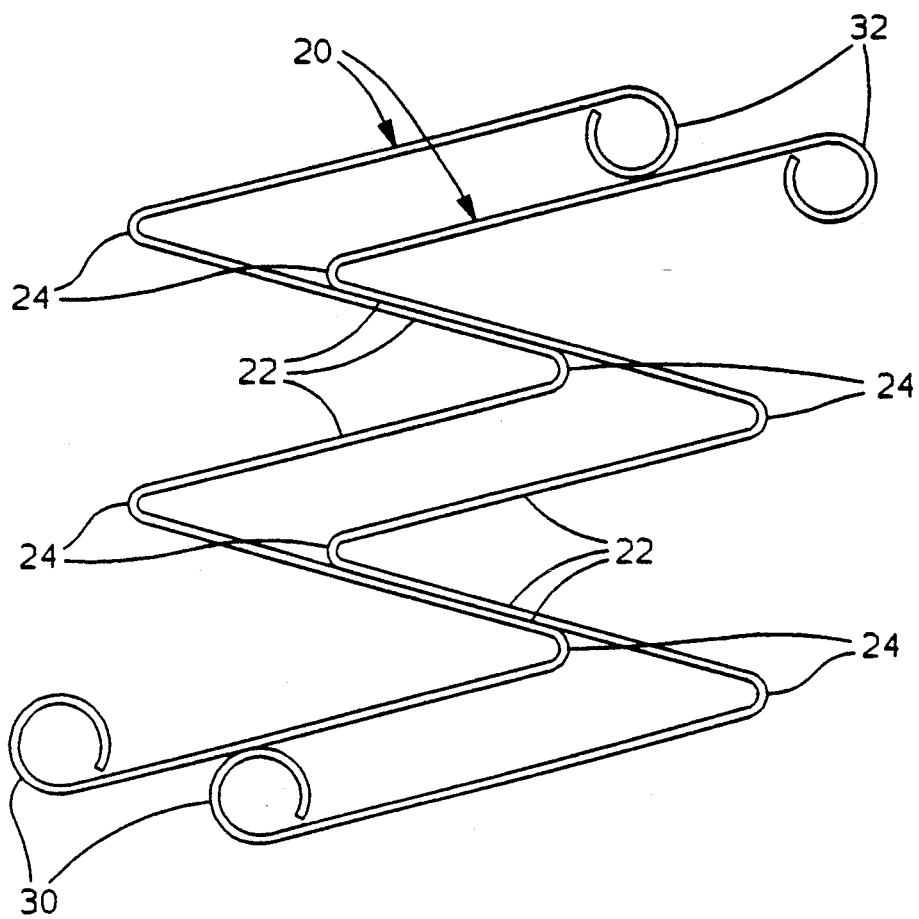
FIG. 7 is a plan view of two of the FIG. 2 springs showing the anti nesting feature.

Referring to FIGS. 6 and 7, other advantages of the disclosed embodiment are illustrated. A typical accordion spring is bent to shape from a blank cut off of a continuous strip of spring steel, and then handled separately and individually. Subsequent operations may include heat treating or corrosion coating, and, of course, the springs have to be shipped en masse to an assembly station and individually handled during assembly into the roller pockets 34. Typically, individual springs would have to be stuck onto a long strip of tape for shipping and handling, or, alternatively, shipped in bulk and then vibrated out of a large bin or bowl one at a time. Bulk handling a mass of conventional springs could lead to nesting, that is, one spring sliding within the loops of another and sticking together. As seen in FIG. 7, the loops 30 and 32 also prevent complete nesting of the parts. Furthermore, as seen in FIG. 6, complete loops like 30 and 32 allow a row of springs 20 to be serially threaded onto a metal carrier rod 50 as they are manufactured. Rod 50 provides both a convenient shipping and handling carrier, and may conveniently be used to keep the springs 20 in a row as they are run through a heat treat or other process on a conveyor 52. The capability of keeping the springs 20 in an as-manufactured, serial order, also assures the ultimate assembler that the complement of springs that is installed into any particular clutch came from a contiguous strip of spring stock, and are therefore more likely to match one another in terms of resilience, elasticity and stock thickness.

In conclusion, the embodiments 20 and 44 disclosed provide myriad advantages with the relatively simple end loop type of stop flange disclosed. However, other shapes are possible, so it is not intended to limit the invention to just the embodiments disclosed.

The embodiments of the invention in which an exclusive property or privilege are claimed are defined as follows:

1. In an overrunning roller clutch of the type in which each of a plurality of rollers located in cage pockets of predetermined width has a roller length substantially equal to said pocket width and travels back and forth over a normal path during clutch operation, but is subject to disturbing forces that can move said roller back toward the base of said pocket beyond said normal path, an accordion type roller energizing spring, comprising,
   a series of flat leaves with front and rear end leaves and intermediate leaves between, and with each of said intermediate leaves being joined to an adjacent leaf at a resilient pleat having a minimum thickness creating an inherent spring solid height beyond which said spring should not be compressed, each of said intermediate leaves having a length less than said predetermined width, at least one of said front and rear end leaves having an integrally formed terminal stop flange extending beyond said intermediate spring leaf length and with a height substantially equal to said spring solid height and a width less than half of the differential between said pocket width and said intermediate leaf length,
   whereby, as said roller travels during normal clutch operation, said stop flange clears said pleats, and when said roller moves back in response to said disturbing forces, said stop flange engages between said roller and pocket base, thereby preventing said pleats from over compressing.

2. In an overrunning roller clutch of the type in which each of a plurality of rollers located in cage pockets of predetermined width has a roller length substantially equal to said pocket width and travels back and forth over a normal path during clutch operation, but is subject to disturbing forces that can move said roller back toward the base of said pocket beyond said normal path, an accordion type roller energizing spring, comprising,
   a series of flat leaves with front and rear end leaves extending in opposite directions and intermediate leaves between, and with each of said intermediate leaves being joined to an adjacent leaf at a resilient pleat having a minimum thickness creating an inherent spring solid height beyond which said spring should not be compressed, each of said intermediate leaves having a length less than said predetermined width, each of said front and rear end leaves having an integrally formed terminal stop flange extending beyond said intermediate spring leaf length and with a height substantially equal to said spring solid height and a width less than half of the differential between said pocket width and said intermediate leaf length,
   whereby, as said roller travels during normal clutch operation, said stop flanges clear said pleats, and when said roller moves back in response to said disturbing forces, said stop flanges engage between said roller and pocket base on each side of said spring, thereby preventing said pleats from over compressing.

3. In an overrunning roller clutch of the type in which each of a plurality of rollers located in cage pockets of predetermined width has a roller length substantially equal to said pocket width and travels back and forth over a normal path during clutch operation, but is subject to disturbing forces that can move said roller back toward the base of said pocket beyond said normal path, an accordion type roller energizing spring, comprising,
   a series of flat leaves with front and rear end leaves extending in opposite directions and intermediate leaves between, and with each of said intermediate leaves being joined to an adjacent leaf at a resilient pleat having a minimum thickness creating an inherent spring solid height beyond which said spring should not be compressed, each of said intermediate leaves having a length less than said predetermined width, each of said front and rear end leaves having an integrally formed end loop with a diameter substantially equal to said spring solid height and less than half of the differential between said pocket width and said intermediate leaf length, whereby, as said roller travels during normal clutch operation, said loops clear said pleats, and when said roller moves back in response to said disturbing forces, said loops engage between said roller and pocket base on each side of said spring, thereby preventing said pleats from over compressing.

* * * * *